Figure 1:
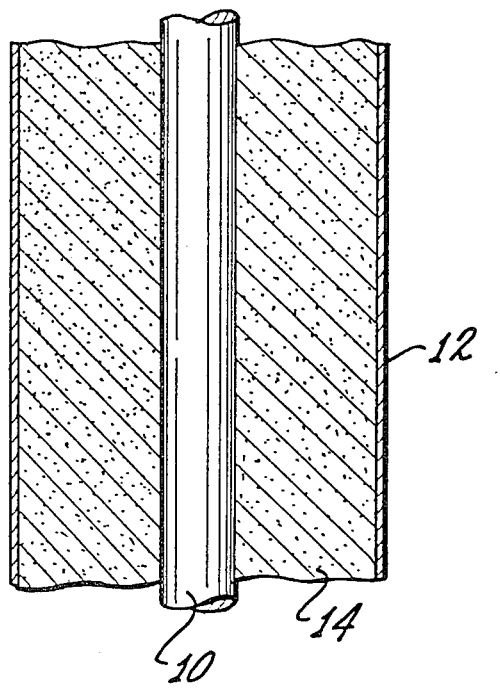

United States Patent [19]

Kyle

[11] 4,424,090
[45] Jan. 3, 1984

[54] INSULATING MATERIAL AND METHOD OF MAKING MATERIAL

[76] Inventor: James C. Kyle, 24372 Via San Clemente, Mission Viejo, Calif. 92692

[21] Appl. No.: 428,109

[22] Filed: Sep. 29, 1982

Related U.S. Application Data

[62] Division of Ser. No. 214,256, Dec. 8, 1980, Pat. No. 4,371,588.

[51] Int. Cl.$^3$ .......................... C03C 27/02; C03C 3/52
[52] U.S. Cl. ...................................... 156/89; 65/21.1; 501/15; 501/23; 501/33
[58] Field of Search ........................... 501/15, 23, 33; 65/21.1; 156/89

[56] References Cited

U.S. PATENT DOCUMENTS

| | | | |
|---|---|---|---|
| 2,949,376 | 8/1960 | Comer | 501/23 |
| 3,410,674 | 11/1968 | Martin | 501/23 |
| 3,957,496 | 5/1976 | Eagan | 156/89 |
| 4,029,897 | 6/1977 | Meyer | 501/15 |

*Primary Examiner*—D. John Smith
*Attorney, Agent, or Firm*—Ellsworth R. Roston; Charles H. Schwartz

[57] ABSTRACT

A material is provided for producing a hermetic seal with a member made from one of the following: titanium, titanium alloys, platinum, chromel, Alumel, stainless steels and Inconel. The material is particularly adapted to be used with titanium, titanium alloys, Inconel and the 300 series of stainless steels since it has at different temperatures a coefficient of thermal expansion matching changes in the coefficient of thermal expansion of titanium, titanium alloys, Inconel and the 300 series of stainless steels throughout a range of temperatures to approximately 1500° F. The material is partially polycrystalline and partially amorphous and is provided with a high electrical insulation and is impervious to acids and thermal and mechanical shocks. The material may have the following composition:

| Oxide | Range of Percentages by Weight |
|---|---|
| Lead oxide (red lead) | 57–68 |
| Silicon dioxide | 28–32 |
| Soda ash (sodium carbonate) | 0.4–0.6 |
| Titanium dioxide | 3.2–3.9 |
| Zirconium oxide | 3.0–3.7 |
| Boric acid | 2.2–2.6 |

7 Claims, 2 Drawing Figures

INSULATING MATERIAL AND METHOD OF MAKING MATERIAL

This is a division of application Ser. No. 214,256, filed Dec. 8, 1980, now U.S. Pat. No. 4,371,588.

This invention relates to an electrical insulating material and more particularly relates to an electrical insulating material having the properties of remaining hermetically sealed throughout an extended range of temperatures to a member made from a pre-selected material. The insulating material of this invention has particular advantages because its coefficient of thermal expansion changes throughout an extended range of temperatures at a rate corresponding to the changes in the coefficient of thermal expansion throughout such temperature range of a member made from a suitable material such as titanium, Inconel or the 300 series of stainless steel. The invention also relates to the combination of the insulating material and the member and to the method of forming the insulating material and the method of sealing the material to the member.

It is often desirable to seal an electrically insulating material to a member made from a suitable material such as titanium, titanium alloys, Inconel or stainless steel in the 300 series. Inconel has a composition including such metals as nickel, cobalt, iron, vanadium and chromium. It is also desirable that the hermetic seal be maintained on an optimum basis throughout an extended range of temperatures such as a range to approximately 1500° F.

Considerable effort has been devoted to provide an insulating material which can be sealed satisfactorily to members made from such materials as titanium, titanium alloys, Inconel or stainless steel in the 300 series. It is particularly desirable that the insulating material maintain such a hermetic seal on an optimum basis throughout an extended range of temperatures such as a range to approximately 1500° F. Such a hermetic seal has utility in a number of different fields. For example, such a seal has utility in earth satellites since titanium and titanium alloys are common materials in such satellites and since the satellites are subjected to considerably elevated temperatures.

Partial success has been attained in that insulating materials have been developed which provide hermetic seals at least sometimes to titanium, titanium alloys and stainless steels in the 300 series throughout a limited range of temperatures. However, in spite of such considerable effort, no insulating material has been developed which maintains an electrical seal with titanium, titanium alloys, Inconel or stainless steels in the 300 series throughout an extended range of temperatures such as a range to approximately 1500° F.

This invention provides an electrically insulating material which overcomes the disadvantages described above. For example, the insulating material has a coefficient of thermal expansion which changes at progressive temperatures throughout an extended temperature range (such as a range to 1500° F.) at a rate corresponding substantially to the changes in the coefficient of thermal expansion of the member throughout such extended range of temperatures. This is particularly true when the member is made from titanium, titanium alloys, Inconel or stainless steel in the 300 series.

The material of this invention also has other advantages of some importance. For example, it provides a high electrical resistivity such as a resistivity in the order of $10^{14}$ or $10^{15}$ ohms. It also can be made relatively easily and it can be sealed to the member relatively easily. Furthermore, if a seal is not first produced between the material and the member, the material is advantageous in that the method of sealing the material and the member can be repeated to produce the desired seal. The insulating material is also able to withstand mechanical and thermal shocks and stresses and is impervious to acids.

The material of this invention may have the following composition:

| Oxide | Range of Percentages by Weight |
| --- | --- |
| Lead oxide (red lead) | 57–68 |
| Silicon dioxide | 23–32 |
| Soda ash (sodium carbonate) | 0.4–0.6 |
| Titanium dioxide | 3.2–3.9 |
| Zirconium oxide | 3.0–3.7 |
| Boric acid | 2.2–2.6 |

Figure 2:
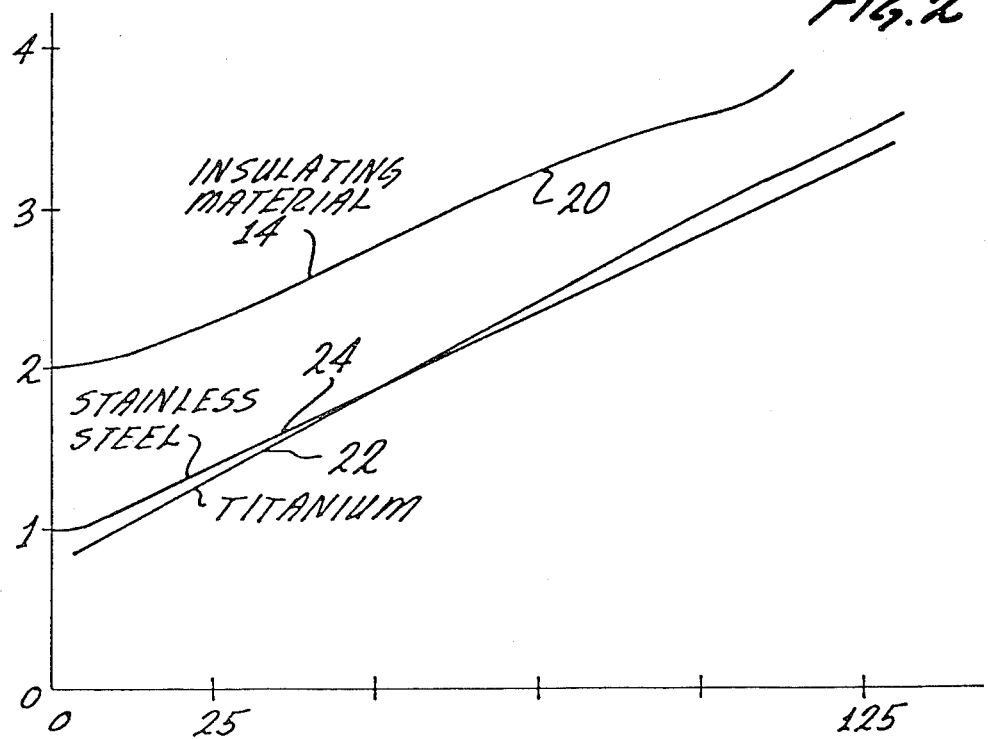

In the drawings:

FIG. 1 is a sectional view of a seal produced between a pair of members by the disposition between the members of insulating material included within this invention; and FIG. 2 provides graphs illustrating changes in the coefficient of thermal expansion throughout an extended range of temperatures for titanium, stainless steel of the 300 series and the insulating material of this invention.

In the embodiment of this invention shown in FIG. 1, a pair of members 10 and 12 are shown in spaced relationship. Each of the members 10 and 12 may be made from a suitable material such as titanium, titanium alloys (such as 6A14V titanium alloy containing titanium, six percent (6%) aluminum and four percent (4%) vanadium), platinum, chromel, Alumel, stainless steels (such as in the 300 series) and Inconel. The members 10 and 12 may be hermetically sealed to each other by an insulating material 14 included within this invention.

The insulating material 14 has certain important and desirable properties. It is provided with a high electrical resistance such as a resistance in the order of $10^{14}$ to $10^{15}$ ohms. Its coefficient of thermal expansion also changes at progressive temperatures throughout an extended range (such as a range to approximately 1500° F.) at a rate matching the changes in the coefficient of thermal expansion of the members 10 and 12 throughout such range. This is particularly true when the members are made from titanium, titanium alloys, Inconel or stainless steels in the 300 series. Such matching changes in the coefficients of thermal expansion may be seen from FIG. 2, which illustrates at 20 the coefficient of thermal expansion of the material 14, at 22 the coefficient of thermal expansion of the member 10 when the member is made from titanium and at 24 the coefficient of thermal expansion when the member is made from stainless steel in the 300 series.

As will be seen, the changes in the coefficients of thermal expansion of the member 10 and the material 14 are matched substantially throughout a range of temperatures to approximately 1500° F. As a result, the material 14 is able to maintain the hermetic seal with the member 10 throughout the extended range of temperatures to approximately 1500° F. A satisfactory seal can be similarly provided between the member 12 and the material 14 when the member 12 is made from a material having a coefficient of thermal expansion substantially matching that of the material 14.

As will be appreciated, the compressive force exerted by the material 14 on the member 10 or on the member 12 is dependent upon the difference in the coefficients of thermal expansion of the material 14 and the member 10 or of the material 14 and member 12. Since the difference in the coefficients of thermal expansion remain substantially constant with changes in temperature, the compressive forces exerted by the material 14 on the members 10 and 12 remain substantially constant with such changes in temperature. This facilitates the retention of the hermetic seal between the material 14 and the members 10 and 12 with such changes in temperature.

The insulating material 14 may have the following composition:

| Oxide | Range of Percentages by Weight |
|---|---|
| Lead oxide (red lead) | 57–68 |
| Silicon dioxide | 23–32 |
| Soda ash (sodium carbonate) | 0.4–0.6 |
| Titanium dioxide | 3.2–3.9 |
| Zirconium oxide | 3.0–3.7 |
| Boric acid | 2.2–2.6 |

As is well known, silicon dioxide is a common material in glasses and ceramics. Lead oxide provides a considerable control over the melting temperature of the insulating material 14 and also provides a considerable control over the characteristics of the coefficient of thermal expansion of the insulating material. The lead oxide also controls the electrical resistivity of the insulating material 14. The relative percentages of the silicon dioxide and the lead oxide in the insulating material 14 tend to control the coefficient of thermal expansion of the material so that the changes in the coefficient of the thermal expansion of the material 14 are matched to those of the members 10 and 12. The matching of such changes in the coefficients of thermal expansion is particularly enhanced because of the relatively high ratio of red lead to silicon dioxide in the insulating material 14.

Boric acid acts as a glass former. It facilitates the production of at least a partially amorphous state in the insulating material 14. Sodium carbonate is also a glass former. Since it is actually a powerful glass former, the relatively small amount of soda ash in the insulating material 14 has a greater effect than the low percentage would indicate. Soda ash is especially helpful in providing the insulating material 14 with substantially the same changes in the coefficient of thermal expansion as each of the members 10 and 12 when the members are made from titanium. Zirconium oxide and titanium dioxide are crystallites and insure that the insulating material is at least partially crystalline.

The insulating material 14 may be formed by mixing the different materials in the particular ranges specified above and heating the mixture to a suitable temperature such as a temperature to approximately 1700° F. The mixture may then be maintained at this temperature for a suitable period of time such as a period to approximately three (3) hours. The material may then be quenched in a suitable liquid such as water and then ground and formed into beads.

The insulating material 14 produced after the quenching operation is partially amorphous and partially polycrystalline. The relative proportions of the insulating material 14 in the amorphous and polycrystalline states are somewhat independent of the temperatures and periods of time in which the mixture is heated. This is particularly true since the mixture tends to become partially amorphous and partially polycrystalline at the time that the mixture melts. As a result, the mixture may be melted repetitively without affecting significantly the properties of the material.

When the insulating material 14 is to be sealed to the member 10 or to the members 10 and 12, the beads of the material 14 are disposed in abutting relationship to the members to be sealed. The beads and the members are then heated to an elevated temperature for a limited period of time. For example, when the member 10 is made from titanium, the member 10 and the material 14 are heated to a suitable temperature such as approximately 1300° F. for a limited period of time such as a period of approximately thirty (30) minutes to produce the seal between the member 10 and the insulating material 14. Similarly, when the member 10 is made from stainless steel in the 300 series, the member 10 and the material 14 are heated to a suitable temperature such as approximately 1600° F. for a limited period of time such as a period of approximately thirty (30) minutes.

The period of time for heating the member 10 and the insulating material 12 to the elevated temperature to seal the member and the insulating material is not especially critical. For example, the member 10 and the material 12 may be maintained at the elevated temperature (such as approximately 1300° F. when the member 10 is made from titanium or such as approximately 1600° F. when the member 10 is made from stainless steel) for a period of time to approximately three (3) hours without affecting the properties of the material 14 or without affecting the hermetic seal between the material 14 and the member 10. This results in part from the fact that the material 14 is primarily polycrystalline.

Since the period of time for sealing the member 10 and the material 14 can be varied within wide limits, the member 10 and the material 14 can be heated to the elevated temperature such as approximately 1300° F. or 1600° F. a plurality of times, if necessary, to assure that a safisfactory hermetic seal is produced between the member and the material. For example, if tests reveal that a satisfactory hermetic seal has not been produced between the member 10 and the material 14 after they have been maintained for a first period of time at the elevated temperature, the member 10 and the material may be heated again to the elevated temperature and maintained at the elevated temperature for an additional period of time.

When the insulating material is to be sealed to a member 10 made from titanium, it preferably has the following composition:

| Oxide | Percentage by Weight |
|---|---|
| Lead oxide (red lead) | 64.9 |
| Silicon dioxide | 25.3 |
| Soda ash (sodium carbonate) | 0.5 |
| Titanium dioxide | 3.5 |
| Zirconium oxide | 3.3 |
| Boric acid | 2.4 |

When the insulating material 14 has the above composition, it is able to be hermetically sealed to titanium at a temperature of approximately 1300° F.

The percentages of the different oxides in the insulating material 14 may be modified to provide for an efficient sealing of the material to the member 10 when the member is made from stainless steel in the 300 series. For example, the insulating material 4 may have the following composition:

| Oxide | Percentage by Weight |
|---|---|
| Lead oxide (red lead) | 61.4 |
| Silicon dioxide | 27.9 |
| Soda ash (sodium carbonate) | 0.5 |
| Titanium dioxide | 3.9 |
| Zirconium oxide | 3.7 |
| Boric acid | 2.6 |

The insulating material may be sealed to the stainless steel in a range of temperatures between approximately 1200° F. and 1600° F. and is preferably sealed to stainless steel at a temperature approaching 1600° F.

When the insulating material has the composition specified above, its coefficient of thermal expansion throughout a range of temperatures to approximately 1500° F. changes at a rate which matches the changes in the coefficient of thermal expansion of stainless steel in the 300 series. For example, the coefficient of thermal expansion of the material 14 may be approximately $4 \times 10^{-6}$ in/in/°F. The insulating material 14 is able to withstand a heat soaking at an elevated temperature such as 1000° F. for an extended period such as forty eight (48) hours when it is sealed to a member made from a type 321 stainless steel or a member made from Inconel.

Because of the advantages discussed above, the insulating material of this invention may be sealed to members 10 of smaller size than in the prior art without losing the hermetic seal with the members. For example, the member 10 may be annular with a diameter of one thirty seconds inch (1/32") to one sixteenth inch (1/16") and the insulating material 14 may be hermetically sealed to the member to provide an effective seal through an extended range of temperatures to approximately 1500° F.

The insulating material 14 also has other advantages, particularly when it is used in satellites or space vehicles to seal a member made from a suitable material such as titanium. For example, if a laser beam is applied to a titanium sheet to which has been sealed a sheath of the insulating material 14, the titanium sheet may become pierced by the laser beam. However, the insulating material 14 will flow into the opening in the titanium sheet and effectively close the opening.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A method of forming an electrical material, including the following steps:
mixing the following oxides

| Oxide | Range of Percentages by Weight |
|---|---|
| Lead oxide (red lead) | 57–68 |
| Silicon dioxide | 23–32 |
| Soda ash (sodium carbonate) | 0.4–0.6 |
| Titanium dioxide | 3.2–3.9 |
| Zirconium oxide | 3.0–3.7 |
| Boric acid | 2.2–2.6 | heating the mixture to a suitable temperature to approximately 1700° F. for a particular period of time,
quenching the heated mixture in water, and
forming the quenched mixture into beads.

2. The method set forth in claim 1, including the following additional steps:
applying the beads to a member made from titanium, Inconel or stainless steel in the 300 series, and
heating the beads and the member to a temperature of 1200° F. to 1600° F. for a particular period of time to seal the mixture to the member.

3. The method set forth in claim 1 wherein the mixture has the following composition:

| Oxide | Percentage by Weight |
|---|---|
| Lead oxide (red lead) | 64.9 |
| Silicon dioxide | 25.3 |
| Soda ash (sodium carbonate) | 0.5 |
| Titanium dioxide | 3.5 |
| Zirconium oxide | 3.3 |
| Boric acid | 2.4 | and the mixture is heated for a particular period of time to approximately three (3) hours.

4. The method set forth in claim 1, including the following additional steps:
applying the beads to a member made from one of the following materials:
titanium, titanium alloys, stainless steels, platinum, Chromel, Alumel and Inconel, and
heating the beads and the member to a temperature of approximately 1200° F. to 1600° F. to seal the mixture to the member.

5. The method set forth in claim 4 wherein the mixture has the following composition:

| Oxide | Percentage by Weight |
|---|---|
| Lead oxide (red lead) | 64.9 |
| Silicon dioxide | 25.3 |
| Soda ash (sodium carbonate) | 0.5 |
| Titanium dioxide | 3.5 |
| Zirconium oxide | 3.3 |
| Boric acid | 2.4 | and the member is made from titanium.

6. The method set forth in claim 1, including the following additional steps:
applying the beads to a member made from stainless steel or Inconel, and
heating the beads and the member to a temperature of approximately 1600° F. for a particular period of time to seal the mixture to the member.

7. The method set forth in claim 6 wherein the mixture has the following composition:

| Oxide | Percentage by Weight |
|---|---|
| Lead oxide (red lead) | 61.4 |
| Silicon dioxide | 27.9 |
| Soda ash (sodium carbonate) | 0.5 |
| Titanium dioxide | 3.9 |
| Zirconium oxide | 3.7 |
| Boric acid | 2.6 |

* * * * *